United States Patent
Lee et al.

(10) Patent No.: US 12,002,935 B2
(45) Date of Patent: Jun. 4, 2024

(54) BATTERY PACK CAPABLE OF SWELLING DETECTION

(71) Applicant: LG ENERGY SOLUTION, LTD., Seoul (KR)

(72) Inventors: Ki-Young Lee, Daejeon (KR); Dong-Wan Ko, Daejeon (KR); Do-Yul Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 459 days.

(21) Appl. No.: 17/503,083

(22) Filed: Oct. 15, 2021

(65) Prior Publication Data
US 2022/0037708 A1  Feb. 3, 2022

Related U.S. Application Data

(63) Continuation of application No. PCT/KR2020/015342, filed on Nov. 4, 2020.

(30) Foreign Application Priority Data

Apr. 16, 2020 (KR) .................. 10-2020-0046096

(51) Int. Cl.
*H01M 10/48* (2006.01)
*B60L 3/00* (2019.01)
(Continued)

(52) U.S. Cl.
CPC ......... *H01M 10/488* (2013.01); *B60L 3/0046* (2013.01); *G01B 11/16* (2013.01);
(Continued)

(58) Field of Classification Search
CPC .. H01M 10/488; H01M 10/48; H01M 10/482; H01M 50/209; H01M 2220/20; G01B 11/16; G01N 21/7703; B60L 3/0046
See application file for complete search history.

(56) References Cited

U.S. PATENT DOCUMENTS

2011/0236735 A1  9/2011  Fuse
2011/0262786 A1  10/2011  Fuse
(Continued)

FOREIGN PATENT DOCUMENTS

CN  208013385 U  10/2018
CN  208284596 U  12/2018
(Continued)

OTHER PUBLICATIONS

KR20180049651 English translation. Kim. Korea. May 11, 2018. (Year: 2018).*
(Continued)

*Primary Examiner* — Christopher P Domone
(74) *Attorney, Agent, or Firm* — Birch, Stewart, Kolasch & Birch, LLP

(57) ABSTRACT

A battery pack includes at least one battery cell, an optical fiber sensing unit including a plate-type detection unit made of optical fibers horizontally and vertically arranged in a grid form. The plate-type detection unit is deformed by deformation of the at least one battery cell, a photoresistor to collect light reflected from the optical fiber sensing unit, and a controller configured to determine if swelling occurred in the at least one battery cell based on a resistance value with a change in an amount of light collected by the photoresistor.

12 Claims, 12 Drawing Sheets

(51) Int. Cl.
    *G01B 11/16*     (2006.01)
    *G01N 21/77*     (2006.01)
    *H01M 50/209*     (2021.01)

(52) U.S. Cl.
    CPC ...... *G01N 21/7703* (2013.01); *H01M 10/482* (2013.01); *H01M 50/209* (2021.01); *H01M 2220/20* (2013.01)

(56) References Cited

U.S. PATENT DOCUMENTS

| | | |
|---|---|---|
| 2012/0105835 A1 | 5/2012 | Fuse |
| 2013/0265260 A1 | 10/2013 | Seo et al. |
| 2016/0013522 A1 | 1/2016 | Morrow et al. |
| 2018/0047972 A1 | 2/2018 | Chung et al. |
| 2018/0248233 A1 | 8/2018 | Schade et al. |
| 2019/0198946 A1 | 6/2019 | Yao |
| 2019/0339334 A1 | 11/2019 | Mikolajczak |

FOREIGN PATENT DOCUMENTS

| | | |
|---|---|---|
| CN | 104272219 A | 3/2024 |
| JP | 2003-232631 A | 8/2003 |
| JP | 2004-95361 A | 3/2004 |
| JP | 2005-18417 A | 1/2005 |
| JP | 2009-59582 A | 3/2009 |
| JP | 2011-233343 A | 11/2011 |
| JP | 2013-145716 A | 7/2013 |
| JP | 2014-120335 A | 6/2014 |
| JP | 2017-26311 A | 2/2017 |
| KR | 10-2009-0104563 A | 10/2009 |
| KR | 10-1526516 B1 | 6/2015 |
| KR | 10-1615043 B1 | 4/2016 |
| KR | 10-1872901 B1 | 7/2018 |
| KR | 10-2019-0106539 A | 9/2019 |

OTHER PUBLICATIONS

CN208013385 English translation. Chen. China. Oct. 26, 2018. (Year: 2018).*

* cited by examiner

BATTERY PACK CAPABLE OF SWELLING DETECTION

RELATED APPLICATIONS

The present application is a By-Pass Continuation of International Application No. PCT/KR2020/015342, filed on Nov. 4, 2020, and which claims the benefit of Korean Patent Application No. 10-2020-0046096 filed on Apr. 16, 2020 with the Korean Intellectual Property Office, the disclosures of which are explicitly incorporated herein by reference in their entirety.

TECHNICAL FIELD

The present disclosure relates to battery technology, and more particularly, to technology for detecting swelling of a battery cell more effectively in a battery pack including at least one battery cell.

BACKGROUND ART

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages that recharging can be done whenever it is convenient, the self-discharge rate is very low and the energy density is high.

To increase the capacity and output of the lithium secondary battery, i.e., the battery, a battery module including an assembly of battery cells connected in series and/or in parallel or a battery pack including at least one battery module is used. The battery module is generally manufactured in the shape shown in FIG. 1. FIG. 1 shows by example a battery module 4 including a battery cell assembly 1 including a plurality of battery cells arranged and stacked in a direction, and a case 3 having an end plate 2 that covers the battery cell assembly 1.

One of important considerations of the battery module is safety. In particular, swelling may occur in the lithium secondary battery due to gas generation while in use. The swelling usually occurs in abnormal situations, and when swelling is not detected and the lithium secondary battery is continuously used, a fire or explosion may occur, causing a serious problem.

FIG. 2 shows the battery cell assembly 1 deformed by, for example, swelling occurred in the battery module 4 due to the overcharge of the battery cell. When severe swelling occurs, the end plates 2 at two ends expand and bulge in the outward direction of the battery module 4 as shown in FIG. 2. Considering the expansion, the battery module may have a margin, but the margin increases the size of the battery module, so the margin is not a proper solution. Alternatively, a stiff end plate may be placed on two sides of the battery cell assembly to suppress an explosion in the battery module, but the forced expansion suppression of the battery module may adversely affect the life (state of health (SOH)) of the battery cell. Accordingly, since it is difficult to manage swelling through structural improvement of the battery module or the case of the battery pack, it is especially important to detect swelling.

Many suggestions have been made to detect swelling so far, but rapid and accurate swelling detection technology is not yet available. In particular, a pressure type detection method by a pressure sensor mainly used to detect swelling has many positional limitations since the pressure sensor should be disposed at the most swollen location, especially, at the center of the battery module. Additionally, the pressure type detection method cannot detect swelling of the battery cell before the battery cell swells so much and the pressure sensor is pressed. Besides, in the case of the pressure type detection method, when the distance between the battery cells is small, even though the battery cell did not swell, the pressure sensor may be pressed, leading to incorrect detection. Accordingly, to prevent this problem, the distance between the battery cells may increase to some extent, but the volume of the battery module increases. When the battery cells are arranged at a smaller interval to reduce the size of the battery module or the battery pack, it is difficult to measure the pressure of each battery cell.

Accordingly, when swelling is detected more effectively by improving or surpassing the pressure type detection method, it is possible to deal with the swelling before external deformation of the battery module or the battery pack, thereby ensuring safety and reducing customers' complaints.

DISCLOSURE

Technical Problem

The present disclosure is designed to solve the above-described problem, and therefore the present disclosure is directed to providing a battery pack for effectively detecting swelling of a battery cell included in the battery pack and a vehicle comprising the battery pack.

These and other objects and advantages of the present disclosure may be understood by the following description and will be apparent from the embodiments of the present disclosure. In addition, it will be easily understood that the objects and advantages of the present disclosure may be realized by the means set forth in the appended claims and a combination thereof.

Technical Solution

To achieve the above-described object, a battery pack according to the present disclosure includes at least one battery cell, an optical fiber sensor including a plate-type detector made of optical fibers horizontally and vertically arranged in a grid form, wherein the plate-type detector is deformed by deformation of the at least one battery cell, a photoresistor to collect light reflected from the optical fiber sensor, and a controller configured to determine if swelling occurred in the at least one battery cell based on a resistance value with a change in an amount of light collected by the photoresistor.

The at least one battery cell may be a plate-type battery cell, and the plate-type detector of the optical fiber sensor may have a size and location that covers a large scale area of the at least one battery cell.

The at least one battery cell may be a plate-type battery cell and stacked and arranged with an adjacent battery cell such that the large scale areas come into contact with each other to form a battery cell assembly, and the battery cell assembly may be maintained by a case, and the optical fiber sensor may be disposed in the battery cell assembly or between the battery cell assembly and the case.

The photoresistor may be attached to the case. The case may be a module case or a pack case.

The controller may be configured to give a warning or notify of danger when a change in the resistance value is larger than a threshold value.

The optical fiber sensor may further include a wiring to allow input light or external natural light to enter.

The optical fibers may include a core and a clad over the core, and holes in the clad allow light to exit the optical fibers.

The holes may be formed in the clad where the horizontally and vertically arranged optical fibers cross each other.

The holes may be formed in a grid pattern where the horizontally and vertically arranged optical fibers cross each other.

Additionally, to achieve the above-described object, a vehicle according to an aspect of the present disclosure includes the battery pack according to the present disclosure.

Additionally, to achieve the above-described object, a vehicle according to another aspect of the present disclosure includes at least one battery cell, an optical fiber sensor including a plate-type detector made of optical fibers horizontally and vertically arranged in a grid form, wherein the plate-type detector is deformed by deformation of the at least one battery cell, a photoresistor to collect light reflected from the optical fiber sensor, and a controller configured to determine if swelling occurred in the at least one battery cell based on a resistance value with a change in an amount of light collected by the photoresistor.

Advantageous Effects

According to the present disclosure, it is possible to detect swelling of the battery cell provided in the battery pack effectively and accurately.

Additionally, according to an aspect of the present disclosure, since it is not a pressure type detection method, there is no need for the optical fiber sensing unit at the center of the battery cell, thereby reducing the volume of the battery pack and improving the energy density of the battery pack.

Additionally, according to an aspect of the present disclosure, even when swelling in the battery cell is not so severe, it is possible to detect the swelling rapidly. Accordingly, according to this aspect of the present disclosure, it is possible to deal with the swelling of the battery cell at the early stage.

Further, according to an aspect of the present disclosure, it is possible to acquire swelling information of the battery cell in a device including the battery pack, for example, a vehicle including the battery pack.

BRIEF DESCRIPTION OF THE DRAWINGS

The accompanying drawings illustrate a preferred embodiment of the present disclosure, and together with the detailed description of the present disclosure described below, serve to provide a further understanding of the technical aspects of the present disclosure, and thus the present disclosure should not be construed as being limited to the drawings.

DETAILED DESCRIPTION

Figure 1:
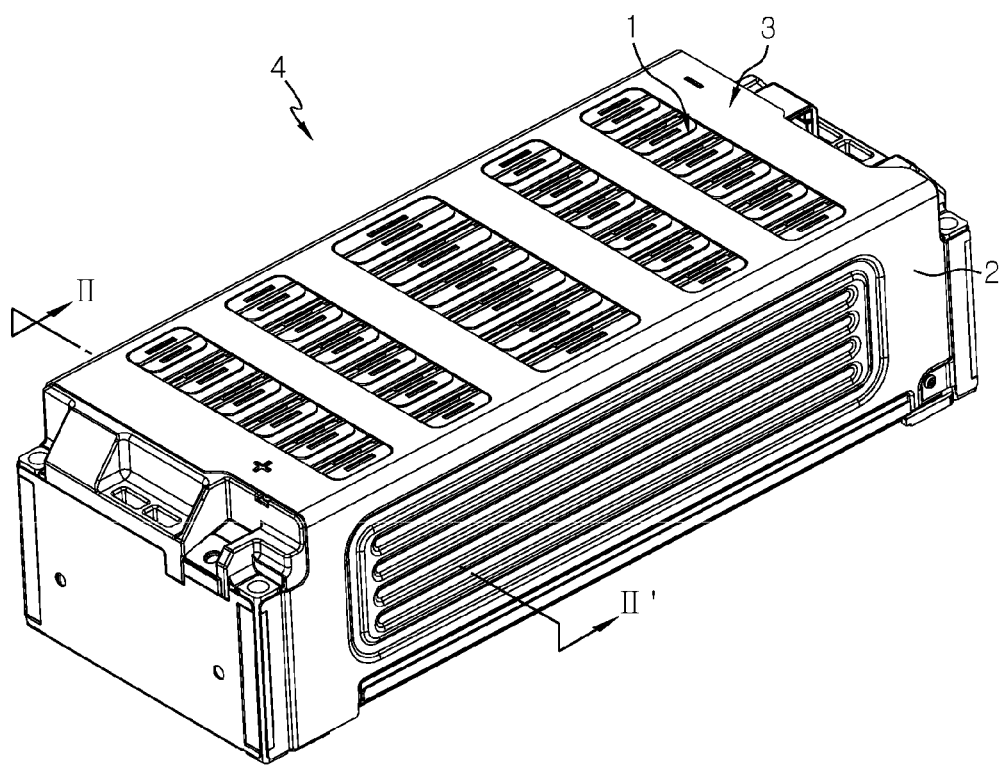
FIG. 1 is a perspective view showing the shape of a common battery module.
Figure 2:
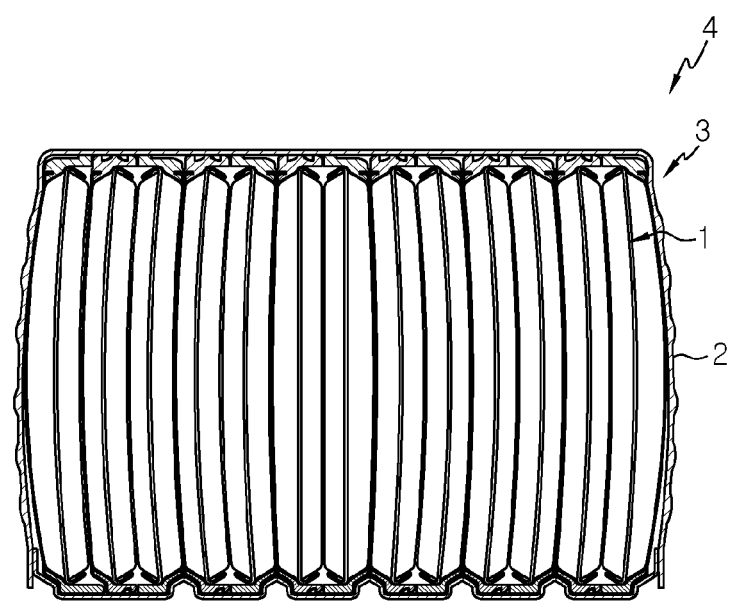
FIG. 2 is a cross-sectional view taken along the line II-IP of FIG. 1, schematically showing an example of swelling occurred in the battery module of FIG. 1.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

Figure 3:
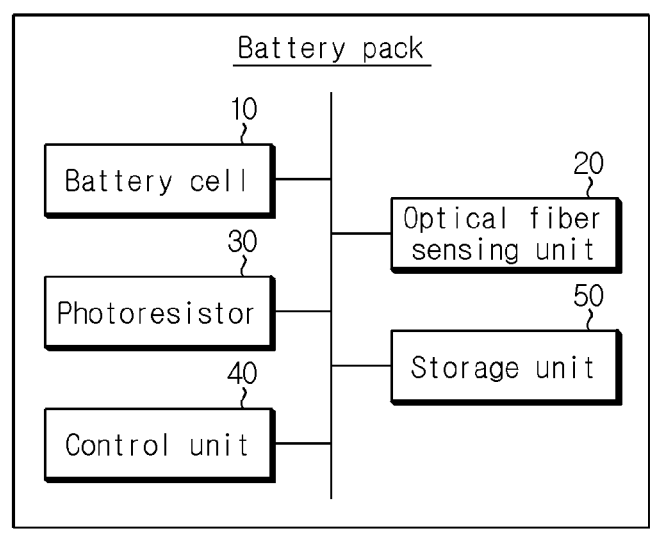
FIG. 3 is a schematic functional block diagram of a battery pack according to an embodiment of the present disclosure.

FIG. 3 is a schematic functional block diagram of a battery pack according to an embodiment of the present disclosure.

Referring to FIG. 3, the battery pack according to the present disclosure includes a battery cell 10, an optical fiber sensing unit 20, a photoresistor 30 and a control unit 40.

The battery cell 10 is a component that stores and releases electrical energy by repeated charging and discharging, and may be a secondary battery. In particular, the battery cell 10 according to the present disclosure may be a plate-type battery cell such as a pouch-type secondary battery.

Meanwhile, the battery pack may include at least one battery cell 10. In particular, the battery pack preferably includes a plurality of battery cells 10. For example, the battery cells 10 may be horizontally or vertically stacked and received in a pack case. There is no limitation on the type or shape of the pack case. Alternatively, at least one battery cell 10 may be received in the module case to form a battery module, and at least one battery module may be received in the pack case. There is no limitation on the type of shape of the module case.

Figure 4:
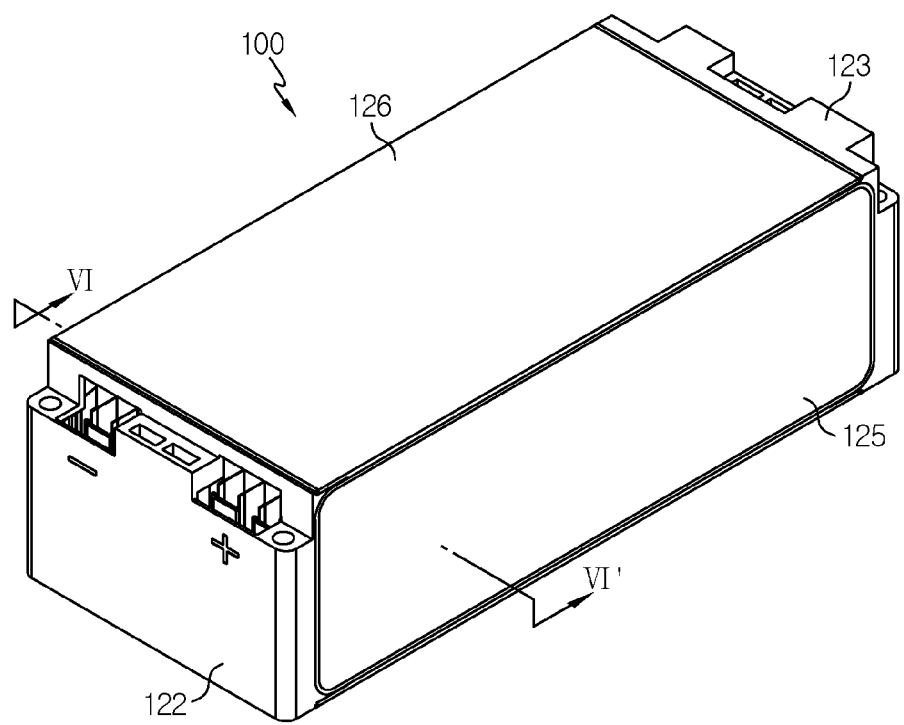
FIG. 4 is a schematic perspective view of a battery module included in a battery pack according to an embodiment of the present disclosure.
Figure 5:
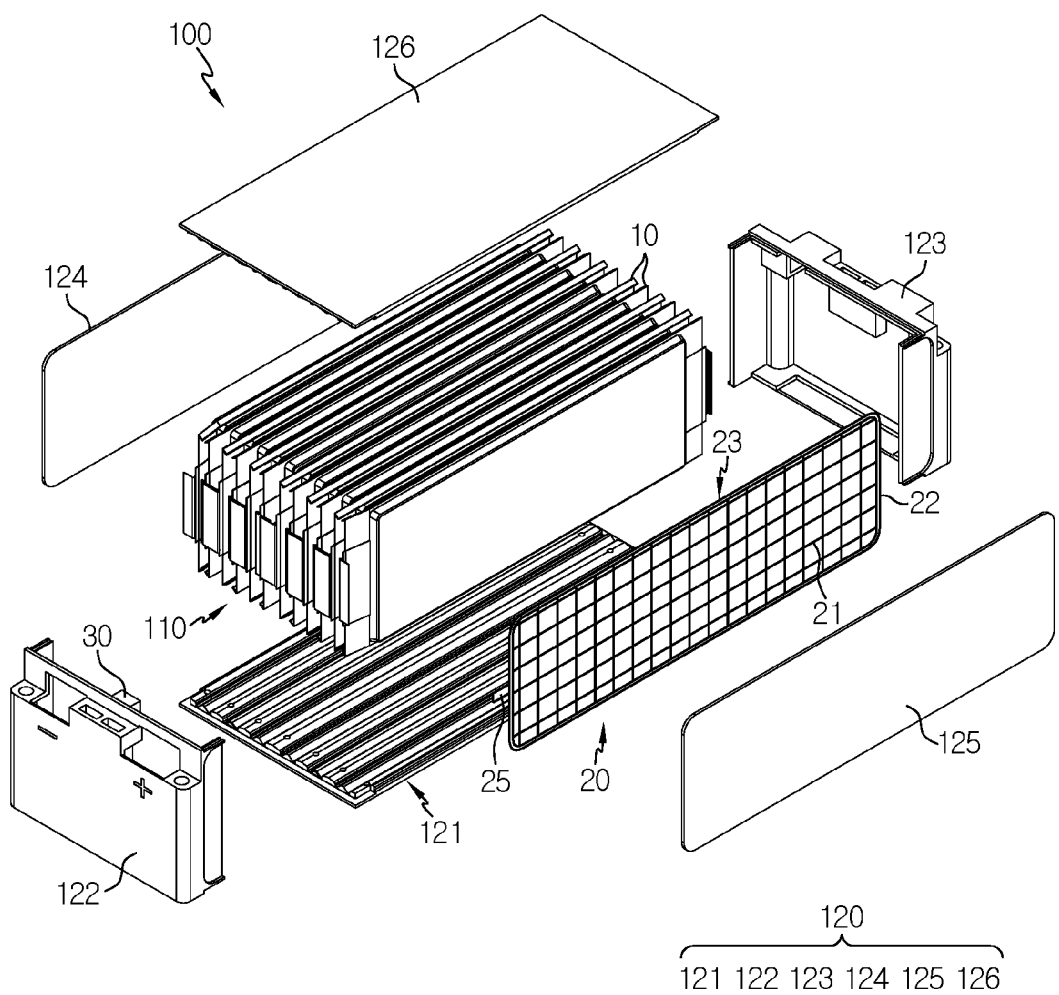
FIG. 5 is an exploded perspective view of FIG. 4.
Figure 6:
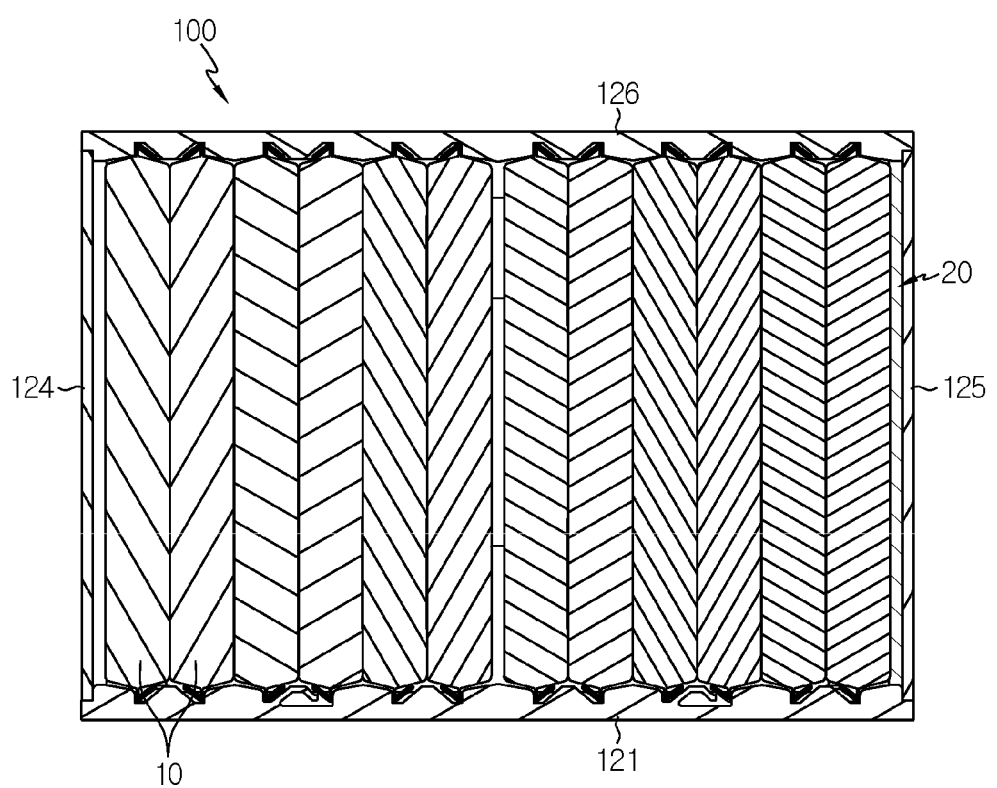
FIG. 6 is a cross-sectional view taken along the line VI-VI' of FIG. 4.

FIG. 4 is a schematic perspective view of the battery module included in the battery pack according to an embodiment of the present disclosure. FIG. 5 is an exploded perspective view of FIG. 4. FIG. 6 is a cross-sectional view taken along the line VI-VI' of FIG. 4.

Referring to FIGS. 4 to 6, the battery module 100 presented as an example includes a battery cell assembly 110 and a module case 120. The battery cell assembly 110 is maintained by the module case 120. The module case 120 presented as an example includes a cooling plate 121, a front cover 122, a rear cover 123, side covers 124, 125 and an upper plate 126.

The battery cell assembly 110 includes at least one battery cell 10. The battery cell 10 may include an electrode assembly, an electrolyte solution and a packaging. Here, the electrode assembly is an assembly of an electrode and a separator, and may include at least one positive electrode plate and at least one negative electrode plate with the separator interposed between. Additionally, each electrode plate of the electrode assembly has an electrode tab and may be connected to one end of the electrode lead. The other end of the electrode lead is exposed to the outside through the packaging, and the exposed portion may serve as an electrode terminal of the battery cell 10.

When the battery module 100 includes a plurality of battery cells 10, the battery cells 10 may be stacked in at least one direction to form the battery cell assembly 110. For example, as shown in FIG. 5, the plurality of battery cells 10 such as pouch-type secondary batteries may stand upright approximately perpendicular to the ground so that two wide surfaces (large scale areas) are each disposed on the left and right sides, and sealing parts are disposed on the upper, lower, front and rear sides. The battery cells 10 standing upright may be arranged in parallel in the left-right directions such that the large scale areas contact each other. That is, the battery cell 10 is a plate-type battery cell and stacks and arranges with another adjacent battery cell such that the large scale areas contact each other to form the battery cell assembly 110.

The battery cell assembly 110 may be horizontally stacked on the cooling plate 121. In this case, each battery cell 10 may stand upright on the cooling plate 121, and the bottom of all the battery cells 10 may come into contact with the cooling plate 121. That is, the edge of the battery cell 10 directly cooled by the cooling plate 121 is taken as an example.

The front cover 122 may be disposed at the front side of the battery cell assembly 110 to cover the front end part of the battery cell assembly 110, and the rear cover 123 may be disposed at the rear side of the battery cell assembly 110 to cover the rear end part of the battery cell assembly 110. In particular, the electrode lead of each battery cell 10 may extend to the front and rear sides of the battery cell assembly 110, and the front cover 122 and the rear cover 123 may be formed in a concave shape to receive the electrode lead. For example, the front cover 122 and the rear cover 123 may be formed in an approximately plate shape with the left and right ends bent approximately at a right angle. The front cover 122 and the rear cover 123 may protect the front and rear sides of the battery cell assembly 110 from external physical or chemical factors.

The side covers 124, 125 may be disposed on the left side and the right side of the battery cell assembly 110 to cover the left surface and right surface of the battery cell assembly 110 respectively. In particular, the flat surface of the battery cell 10 provided on the outermost side of the battery cell assembly 110 may be disposed, and the side covers 124, 125 may be formed in an approximately plate shape. For example, the side covers 124, 125 may be formed in the shape of an approximately rectangular plate as shown in FIG. 4. The side covers 124, 125 may protect the sides of the battery cell assembly 110 from external physical or chemical factors.

The upper plate 126 may be disposed on the battery cell assembly 110 to cover the top of the battery cell assembly 110. In particular, the battery cell assembly 110 may be formed in an approximately plate shape. For example, the upper plate 126 may be formed in the shape of an approximately rectangular plate as shown in FIGS. 4 and 5. The upper plate 126 may protect the top of the battery cell assembly 110 from external physical or chemical factors.

In this embodiment, the module case 120 includes the cooling plate 121, the front cover 122, the rear cover 123, the side covers 124, 125 and the upper plate 126. They may be coupled by welding or bolting. In another example, the cooling plate 121 may be replaced with a lower plate similar to the upper plate 126. The module case 120 may be a monoframe in which the other components than the front cover 122 and the rear cover 123 are connected to form a rectangular tubular shape. The present disclosure is not limited to a particular type or shape of the module case.

Meanwhile, the battery cell assembly 110 of this embodiment does not need a cartridge. In general, the cartridge is formed in the shape of an approximately rectangular ring and wraps around the edges of the battery cell 10. The cartridge may receive the battery cell 10 in an internal space, and stack the plurality of battery cells 10 such that the plurality of battery cells 10 is arranged side by side. The battery pack of the present disclosure may be a battery pack including a cartridge.

The optical fiber sensing unit 20 which is an important feature of the present disclosure includes a plate-type detection unit 23 made of optical fibers 21 horizontally and vertically arranged in a grid form. The plate-type detection unit 23 of the optical fiber sensing unit 20 is deformed by deformation of the battery cell 10. To this end, the optical fiber sensing unit 20 may be disposed at the large scale area of the battery cell 10. The optical fiber sensing unit 20 may be directly attached to the battery cell 10, or may be tightly coupled to a gap between the battery cell 10 and another element.

The plate-type detection unit 23 of the optical fiber sensing unit 20 preferably has a size and location that covers the large scale area of the battery cell 10. The plate-type detection unit 23 is not a sensor in the shape of a point or line nor a sensor disposed locally at only a region of the battery cell 10. Accordingly, it is possible to properly reflect changes of the wide surface of the battery cell 10 made due to swelling.

The optical fiber 21 assuming a grid form like weft and warp in weaving may be supported by an edge member 22 having an approximately rectangular shape. As opposed to a general usage example of an optical fiber having an input terminal and an output terminal at two ends for signal transmission in which an optical signal enters the input terminal, the present disclosure uses light reflection on the surface of the optical fiber 21. The present disclosure does not detect a change in intensity of the optical signal that enters one of the ends of the optical fiber 21 and exits the other end. Accordingly, the ends of the optical fiber 21 may be embedded in the edge member 22. There is no need for a light source to generate an optical signal and a detector to detect a change in optical signal intensity. Accordingly, component configuration is very simple.

As well known, the optical fiber 21 includes a core having a high refractive index at the center, and a clad around the core. Conventionally, the optical fiber is used to transmit light through the core without light loss by producing the total reflection between the core and the clad. As opposed to the conventional art, the present disclosure allows light to exit the optical fiber 21 through the clad of the optical fiber 21 arranged in a grid form. The present disclosure extracts light reflected at the interface between the core and the clad of the optical fiber 21 from the clad and detects the light using the photoresistor as described below. The present disclosure proposes the optical fiber sensing unit 20 that causes light to reflect in a region or space that can be measured by the photoresistor and detects the light, and is not a design modification to make the optical fiber grid structure.

Meanwhile, the optical fiber sensing unit 20 may further include a wiring 25 to allow input light or external natural light to enter. Although this embodiment shows the wiring 25 connected to the side of the optical fiber sensing unit 20 in FIG. 5, the location of the wiring 25 is not limited to the illustrated example. The wiring 25 does not need to come into contact with the surface of the battery cell 10. The wiring 25 may further include an input light source, and when the control unit includes a light emitting diode (LED) device as described below, light emitted from the LED device may be used as the input light. When light emitted from the LED device is used, the wiring 25 may be connected to the control unit. In the case of external input light, the ends of the optical fiber 21 are connected to the wiring 25. In case that there is no external input light in the absence of the wiring, external natural light enters through the assembly gap of the battery pack case. When the ends of the optical fiber 21 are embedded in the edge member 22, external natural light entering through the gap of the battery pack case is allowed to be simply reflected from the optical fiber surface. When swelling occurs, the path of reflection on the optical fiber surface changes, and an amount of light arriving at the photoresistor 30 changes. Reflection may include reflection on the optical fiber surface, reflection between core and clad in the optical fiber, and light extraction at the optical fiber grid. Light collected by the photoresistor is light extracted out of the optical fiber grid or light reflected from the optical fiber surface. The light may directly travel to the photoresistor, or may be reflected from the cell surface and then travel to the photoresistor. When there is a gap or hole between core and clad at the grid arrangement, explained later, external natural light may enter and exit through the gap. When swelling occurs, the shape of the optical fiber sensing unit 20 changes and the path of light returning back through the gap or hole changes, and an amount of light arriving at the photoresistor 30 changes as well.

The optical fiber sensing unit 20 may be disposed in the battery cell assembly 110 or between the battery cell assembly 110 and the module case 120. Accordingly, the optical fiber sensing unit 20 may be disposed between two adjacent battery cells 10 in the battery cell assembly 110. Alternatively, the optical fiber sensing unit 20 may be disposed between the outermost battery cell 10 of the battery cell assembly 110 and the side covers 124, 125. This embodiment shows and describes an example of the optical fiber sensing unit 20 disposed between the battery cell assembly 110 and the right side cover 125. One optical fiber sensing unit 20 may be provided, but at least two optical fiber sensing units 20 may be provided. It is important to provide the plate-type detection unit 23 of the optical fiber sensing unit 20 at a location for covering the large scale area of the battery cell 10.

The photoresistor 30 collects light reflected from the optical fiber sensing unit 20, and the resistance value changes depending on the amount of the collected light. The resistance value may be transmitted to the control unit 40. The photoresistor 30 may be attached to the battery cell assembly 110 or the module case 120. This embodiment shows and describes an example in which the photoresistor 30 is attached to the front cover 122 inside the front cover 122, facing the electrode lead. The photoresistor 30 may be attached to any location at which light reflected from the optical fiber sensing unit 20 can be collected. For example, although this embodiment takes an example in which the photoresistor 30 is attached near the upper plate 126 inside the front cover 122, the photoresistor 30 may be disposed closer to the cooling plate 121 inside the front cover 122, may be disposed inside the rear cover 123, may be disposed inside the side covers 124, 125 or may be disposed inside the upper plate 126. One photoresistor 30 may be provided, but or at least two photoresistors 30 may be provided.

The photoresistor is a resistor that changes value with the amount of light. The photoresistor may be referred to as a light-dependent resistor (LDR). The photoresistor is photoconductive such that electrical resistance is low when the amount of light is large. The photoresistor is made of a semiconductor having a high resistance value. The resistance value is in mega ohms (MΩ) in the absence of light, and as the amount of light increases, the electrical resistance reduces to a few hundred of ohms. When light having a particular frequency in the operating range is transmitted to the semiconductor, electrons are released and the resistor reaches the conduction band. Accordingly, free electrons and holes are formed and the resistance value reduces. The range of the resistance value and sensitivity vary depending on the type of the semiconductor used. Since the photoresistor works with even a small amount of light, it is very suitable for a usage environment such as the inside of the battery pack.

The control unit 40 may receive the resistance value with a change in the amount of light collected by the photoresistor 30. The control unit 40 may determine if swelling occurred in the battery cell 10 based on the received resistance value.

Figure 7:
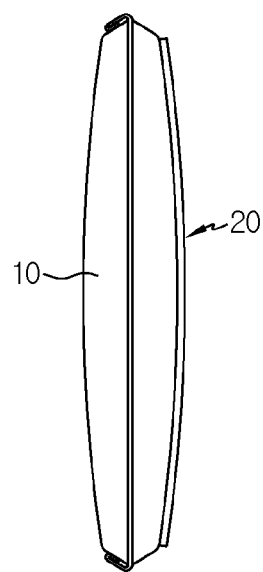
FIG. 7 is a cross-sectional view showing a battery cell deformed due to swelling and an optical fiber sensing unit deformed due to the battery cell.
Figure 8:
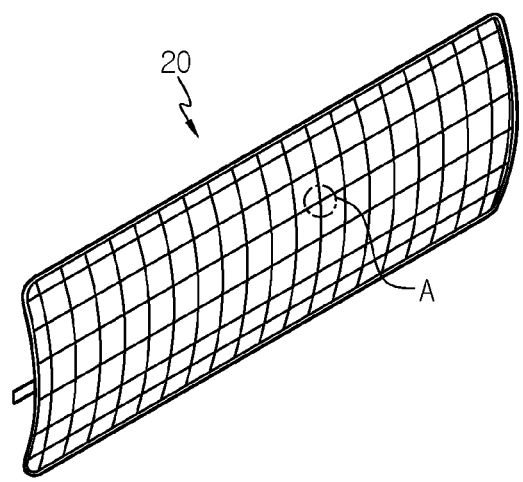
FIG. 8 is a perspective view of an optical fiber sensing unit in the condition of FIG. 7.

FIGS. 5 and 6 show the optical fiber sensing unit 20 before swelling occurs in the battery cell 10. When swelling occurs in the battery cell 10, the battery cell 10 is deformed, the plate-type detection unit 23 is deformed by the deformation. For example, when comparing with the optical fiber sensing unit 20 attached to the battery cell 10 in normal condition as shown in the cross-sectional view of FIG. 6, the cross-sectional view of FIG. 7 shows deformation of the optical fiber sensing unit 20 and the battery cell 10 when swollen. When the battery cell 10 swells, the large scale area of the battery cell 10 may be deformed in a curved shape. FIG. 8 is a perspective view of the optical fiber sensing unit 20 in such a condition. The plate-type detection unit 23 of the optical fiber sensing unit 20 is deformed by the deformation of the battery cell 10.

When comparing the normal condition of FIG. 6 with the swollen condition of FIG. 7, deformation of the optical fiber sensing unit 20 is seen. When the optical fiber sensing unit 20 is deformed, the amount of light reflection on the surface of the optical fiber sensing unit 20 changes. Describing in more detail, for example, in the normal condition of FIG. 6, the optical fiber sensing unit 20 allows light to reflect back to the photoresistor 30 toward the center of the battery cell 10. When the optical fiber sensing unit 20 is deformed as shown in FIG. 7, the amount of light reflecting back to the photoresistor 30 toward the center of the battery cell 10 changes. The amount of light reduces. In another example, in the normal condition of FIG. 6, the optical fiber sensing unit 20 allows light to reflect back through a region that can be measured by the photoresistor 30. When the optical fiber sensing unit 20 is deformed as shown in FIG. 7, the amount of reflected light changes. The amount of reflected light reduces. The photoresistor 30 detects swelling by detecting a difference in the amount of reflected light.

There is a difference in the amount of reflected light reaching the photoresistor 30 between the normal condition and the swollen condition. Accordingly, the resistance value of the photoresistor 30 changes, ad when the control unit 40 receives the resistance value, the control unit 40 determines if swelling occurred in the battery cell based on the resistance value. When swelling is detected, the control unit 40 may inform the condition of the battery pack to a user, or give a notification to provide a solution to the detected condition.

Since the photoresistor 30 works with even a small amount of light, it is possible to detect swelling rapidly even when swelling of the battery cell 10 is not severe. Accordingly, it is possible to deal with the swelling of the battery cell 10 at an early stage. Additionally, since light reflection is used, there is no influence of electronic noise. For example, when the battery pack is mounted on a vehicle including an electrical device having a switching device such as an inverter, it is possible to accurately detect a swelling of the battery cell 10.

The control unit 40 may be configured to give a warning or notify of danger when the change in resistance value is larger than the threshold. The threshold may be pre-stored in memory included in the control unit 40 or a storage device other than the control unit 40. The warning or danger notification enables an operation for stopping or dealing with an unsafe condition or providing a notification of an unsafe condition. For example, a variety of actions may be taken to reduce power consumption or shut off the current in order to prevent the explosion of the battery pack or another dangerous situation.

The control unit 40 may receive the resistance value from the photoresistor 30 at a predetermined time interval, and compare the received current resistance value with the previous resistance value. The previous resistance value that is compared with the current resistance value may be a resistance value measured immediately before, and may be a resistance value that was measured at Birth Of Life (BOL) and stored. The control unit 40 may be configured to interpret the resistance value.

The threshold may be set as necessary, and when the received current resistance value changes by 30% compared to the resistance value measured at BOL and stored, the control unit 40 may be configured to give a warning, and when the current resistance value changes by 70%, the control unit 40 may be configured to notify of danger. In this case, 30% and 70% are each threshold.

When the optical fiber sensing unit 20 is deformed, the amount of reflected light reaching the photoresistor 30 reduces. Accordingly, the resistance value of the photoresistor 30 increases. Accordingly, when the control unit 40 detects an increase in resistance value, the control unit 40 may determine that swelling occurred. When the received current resistance value increases by 30% compared to the resistance value measured at BOL, the control unit 40 may give a warning, and when the current resistance value increases by 70% to the resistance value measured at BOL, the control unit 40 may notify of danger.

The control unit 40 may optionally include processors, application-specific integrated circuits (ASICs), chipsets, logic circuits, registers, communication modems and data processing devices, well known in the art to execute a variety of control logics in the present disclosure. Additionally, when the control logic is implemented in software, the control unit 40 may be implemented as a set of program modules. In this instance, the program module may be stored in memory and executed by the processor. The memory may be inside or outside the processor, and may be connected to the processor with a variety of known means. Further, in many cases, the battery pack includes a control unit, also known as Micro Controller Unit (MCU) or Battery Management System (BMS). The control unit 40 may be implemented by the MCU or the BMS provided in the common battery pack.

Meanwhile, the battery pack according to an embodiment of the present disclosure may further include a storage unit 50 as shown in FIG. 3. The storage unit 50 may store data or programs required for at least some components of the battery pack according to the present disclosure to perform the operations and functions or data created in the process of performing the operations and functions. In particular, the storage unit 50 may store programs and data necessary for the control unit 40 to determine if swelling occurred in the battery cell 10. For example, the storage unit 50 may store the threshold. The storage unit 50 may be a MCU register of the BMS.

The following is an algorithm working method when the control unit 40 is implemented by the components such as MCU or BMS provided in the common battery pack. The initial (or current) amount of reflected light (the resulting resistance value of the photoresistor) is stored in the MCU register of the BMS. A control program is set according to the amount of reflected light. For example, when the resistance value of the photoresistor increases by 30%, a warning is set. When the resistance value of the photoresistor increases by 70%, a danger notification is set. The amount of reflected light is periodically checked during the use of the battery pack. When the resistance value is reached according to the control program settings, the MCU fault out function of the BMS is performed to provide a notification to the user.

The present disclosure uses changes in the amount of reflected light with changes in the shape surface of the optical fiber sensing unit 20, converts an analog value of the amount of reflected light to a resistance value through the photoresistor 30, and determines and controls swelling through the resistance value. In other words, when the battery cell 10 swells, the surface of the optical fiber sensing unit 20 in a grid form is deformed, light reflection on the optical fiber sensing unit 20 changes, and accordingly, the resistance value of the photoresistor 30 changes, and the change is detected by the control unit 40. Since it is not the pressure type detection method, there is no need to place the optical fiber sensing unit 20 at the center of the battery cell 10. Accordingly, it is possible to reduce the volume of the battery pack and improve the energy density of the battery pack.

Meanwhile, when the components of the module case 120 bend due to excessive swelling to form a gap between the components, external light may come in. For example, external light may reach the photoresistor 30 through a gap between the upper plate 126 and the front cover 122. It is possible to detect swelling by a difference in the resistance value of the photoresistor 30 between before and after gap formation.

Although the case in which the battery pack includes the battery module and the battery module includes the battery cell 10 is described with reference to FIGS. 4 to 6, the battery pack may include the plurality of battery cells 10 stacked horizontally or vertically and received in the pack case. In this case, the optical fiber sensing unit and the photoresistor according to the present disclosure may be directly attached to the inside of the pack case.

The battery pack according to the present disclosure may be applied to a vehicle such as an electric vehicle or a hybrid electric vehicle. That is, the vehicle according to the present disclosure may include the battery pack according to the present disclosure. In addition to the battery pack according to the present disclosure, the vehicle according to the present disclosure may include known components mounted on the vehicle, for example, a driving device such as a motor, an electrical component such as a radio or a navigation, a vehicle body and a controller such as an Electronic Control Unit (ECU).

Meanwhile, some of the components of the battery pack according to the present disclosure may be provided in the vehicle. In particular, although the embodiment of FIG. 3 shows the control unit 40 included in the battery pack, the control unit 40 may be included in the vehicle outside the battery pack. It will be described in more detail with reference to FIG. 9.

Figure 9:
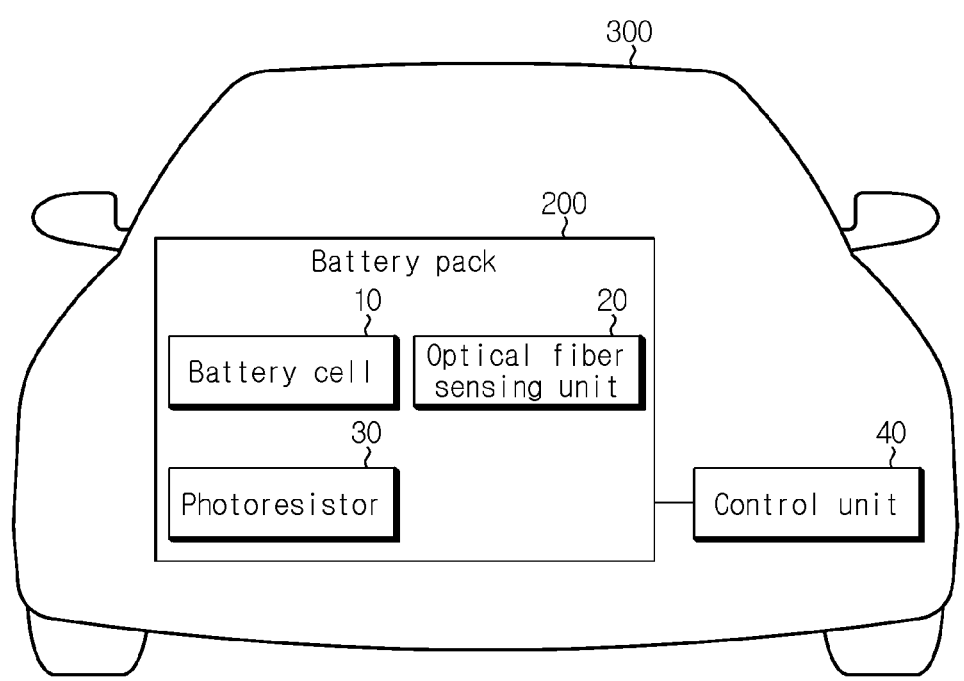
FIG. 9 is a schematic diagram of a vehicle according to an embodiment of the present disclosure.

FIG. 9 is a schematic diagram of the vehicle according to an embodiment of the present disclosure.

Referring to FIG. 9, the vehicle 300 according to the present disclosure may include a battery pack 200 and a control unit 40. Additionally, the battery pack 200 may include a battery cell 10, an optical fiber sensing unit 20 and a photoresistor 30. In particular, as shown in FIG. 9, the control unit 40 may be provided in the vehicle 300, not the battery pack 200. For example, the control unit 40 may be implemented by the ECU of the vehicle 300.

Figure 10:
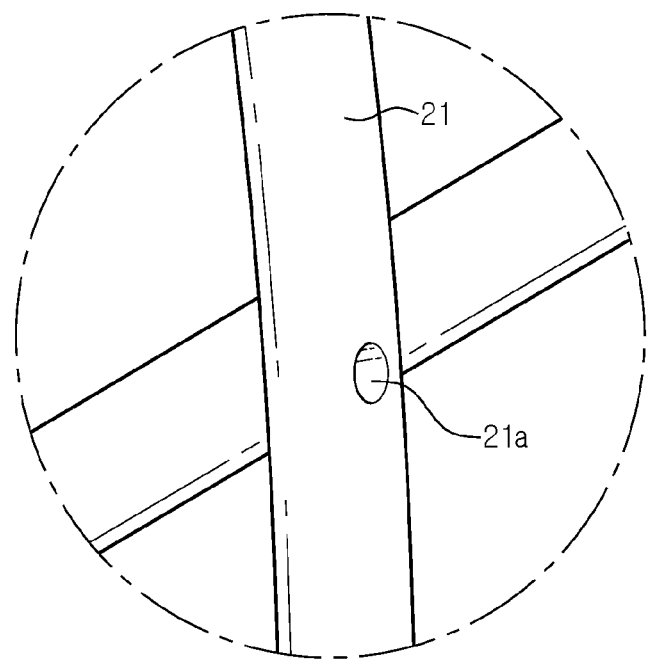
FIGS. 10-12 are detailed views of area A of FIG. 8.
Figure 11:
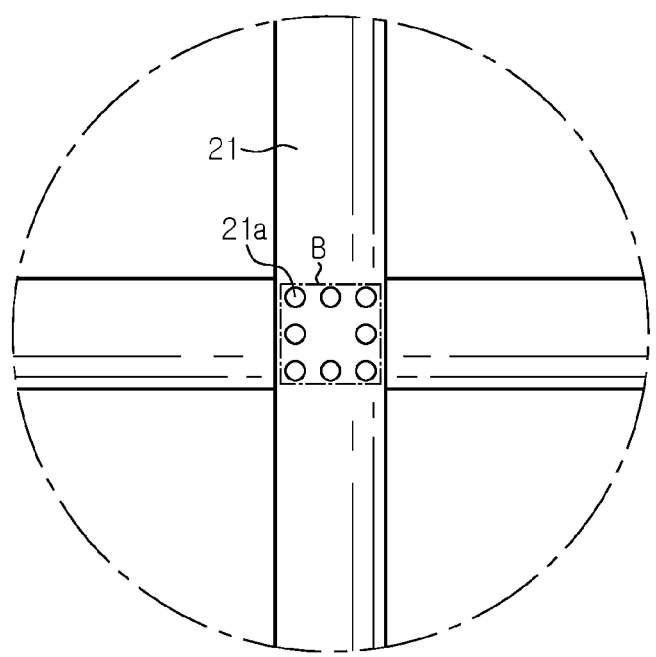
Figure 12:
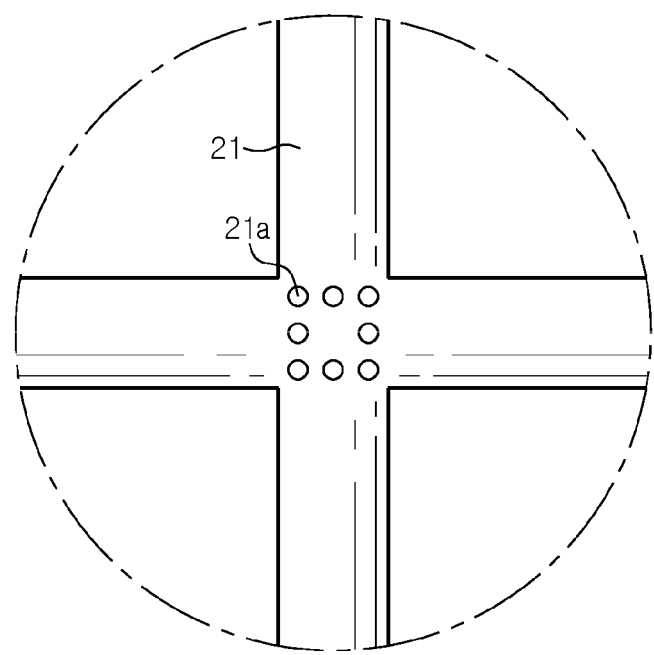

FIGS. 10-12 depict holes or gaps between the core and clad allowing light to enter and exit through the gap. FIG. 10 depicts a single hole 21a and FIGS. 11 and 12 depict holes 21a in a grid pattern. The hole 21a may be formed in the clad of the optical fiber 21 at the grid arrangement of the optical fiber sensing unit 20 as shown in FIG. 10. When the optical fiber sensing unit 20 is a grid form like weft and warp in weaving, the hole 21a may be formed only in the optical fiber 21 placed on top, or may extend to the optical fiber 21 placed below. The number, size, and shape of holes 21a are changeable and variable, and for example, if the part B where the two optical fibers 21 intersect is approximately square as shown in FIG. 11, a total of eight holes 21a may be formed at the vertex portions of the square and therebetween. This forms the holes 21a as closely and uniformly as possible at the intersection. Commercial optical fibers may be woven to form the optical fiber sensing unit 20, but the core may be grid-shaped from the beginning and form a clad surrounding such a core to form the optical fiber sensing unit 20. FIG. 12 depict this case.

Through the gap or hole, light in the optical fiber core may be extracted and transmitted to the photoresistor. The light extracted from the optical fiber may directly travel to the photoresistor, or may be reflected from the cell surface and then travel to the photoresistor. The optical fiber is made of glass having high transparency, and for example, a small hole may be formed in each fiber at the location of the grid to allow light to exit.

In the case of the embodiment of FIG. 9, except that the control unit 40 is provided in the vehicle 300, not the battery pack 200, the description of the previous embodiment may be equally or similarly applied. Accordingly, to avoid redundancy, the repeated detailed description of each component of the battery cell 10, the optical fiber sensing unit 20, the photoresistor 30 and the control unit 40 is omitted herein. Additionally, although not shown in FIG. 9, the vehicle according to the present disclosure may further include a storage unit 50.

The ECU includes a microprocessor such as a Central Processing Unit (CPU), and in addition to the CPU, may include Read Only Memory (ROM) that remembers a processing program, Random Access Memory (RAM) that temporarily remembers data and input/output ports. Accordingly, when the control unit 40 is implemented by the ECU of the vehicle 300, the storage unit 50 may be ROM and RAM.

The control unit 40 periodically checks the resistance value of the photoresistor 30. The control unit 40 gives a warning when the resistance value of the photoresistor increases by 30%. The control unit 40 notifies of danger when the resistance value of the photoresistor increases by 70%. For example, each notification may be used to display that the battery pack 200 may have a safety problem to the user, and turn off the device. An action taken in response to the notification may be to reduce or remove a situation that triggered the notification.

As described above, it is possible to acquire the swelling information of the battery cell in the device including the battery pack according to the present disclosure, for example, the vehicle including the battery pack.

Meanwhile, the terms indicating directions such as upper, lower, left, right, front and rear are used herein for convenience of description only, and it is obvious to those skilled in the art that the term may change depending on the position of the stated elements or an observer.

While the present disclosure has been hereinabove described with regard to a limited number of embodiments and drawings, the present disclosure is not limited thereto, and it is obvious to those skilled in the art that a variety of modifications and changes may be made thereto within the technical aspects of the present disclosure and the equivalent scope of the appended claims.

What is claimed is:

1. A battery pack, comprising:
   at least one battery cell;
   an optical fiber sensor including a plate-type detector made of optical fibers horizontally and vertically arranged in a grid form, wherein the plate-type detector is deformed by deformation of the at least one battery cell;
   a photoresistor to collect light reflected from the optical fiber sensor; and
   a controller configured to determine if swelling occurred in the at least one battery cell based on a resistance value with a change in an amount of light collected by the photoresistor.

2. The battery pack according to claim 1, wherein the at least one battery cell is a plate-type battery cell, and the plate-type detector of the optical fiber sensor has a size and location that covers a large scale area of the at least one battery cell.

3. The battery pack according to claim 2, wherein the at least one battery cell is a plate-type battery cell and stacked and arranged with an adjacent battery cell such that the large scale areas come into contact with each other to form a battery cell assembly, and
   wherein the battery cell assembly is maintained by a case, and the optical fiber sensor is disposed in the battery cell assembly or between the battery cell assembly and the case.

4. The battery pack according to claim 3, wherein the photoresistor is attached to the case.

5. The battery pack according to claim 1, wherein the controller is configured to give a warning or notify of danger when a change in the resistance value is larger than a threshold.

6. The battery pack according to claim 1, wherein the optical fiber sensor further comprises a wiring to allow input light or external natural light to enter.

7. The battery pack according to claim 1, wherein the optical fibers include a core and a clad over the core, and wherein holes in the clad allow light to exit the optical fibers.

8. The battery pack according to claim 7, wherein the holes are formed in the clad where the horizontally and vertically arranged optical fibers cross each other.

9. The battery pack according to claim 7, wherein the holes are formed in a grid pattern where the horizontally and vertically arranged optical fibers cross each other.

10. A vehicle comprising the battery pack according to claim 1.

11. A vehicle, comprising:
   at least one battery cell;
   an optical fiber sensor including a plate-type detector made of optical fibers horizontally and vertically arranged in a grid form, wherein the plate-type detector is deformed by deformation of the at least one battery cell;
   a photoresistor to collect light reflected from the optical fiber sensor; and
   a controller configured to determine if swelling occurred in the at least one battery cell based on a resistance value with a change in an amount of light collected by the photoresistor.

12. The vehicle according to claim 11, wherein the controller is configured to give a warning or notify of danger when a change in the resistance value is larger than a threshold.

* * * * *